A. ALBERTI.
PROCESS OF RECOVERING POTASH SALTS.
APPLICATION FILED MAY 13, 1909.
957,295.
Patented May 10, 1910.
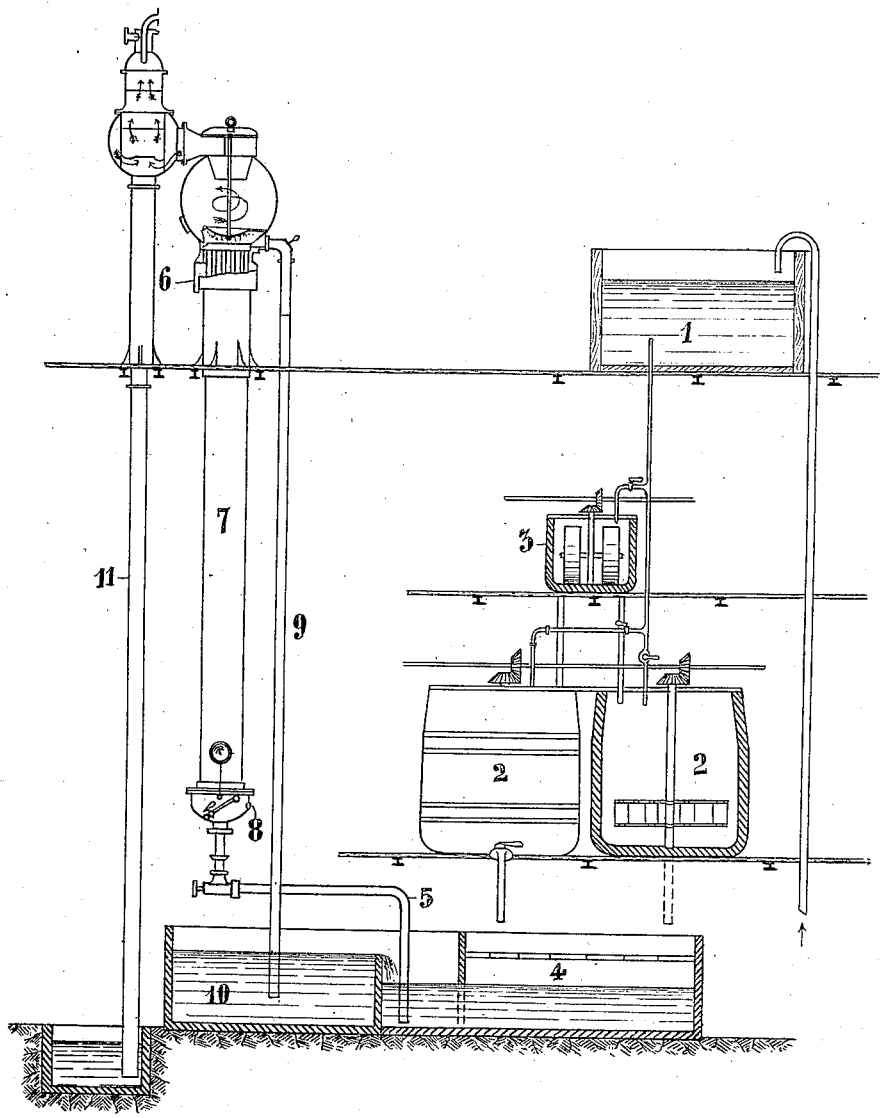
WITNESSES;
INVENTOR,
AUGUSTO ALBERTI,

UNITED STATES PATENT OFFICE.

AUGUSTO ALBERTI, OF ROME, ITALY.

PROCESS OF RECOVERING POTASH SALTS.

957,295.

Specification of Letters Patent. Patented May 10, 1910.

Application filed May 13, 1909. Serial No. 495,580.

*To all whom it may concern:*

Be it known that I, AUGUSTO ALBERTI, chemist, a subject of the King of Italy, residing in the city of Rome, Kingdom of Italy, have invented certain new and useful Improvements in Processes of Recovering Potash Salt, of which the following is a specification.

The subject matter of the present invention is a process for recovery of the potassium salts (chlorids and sulfates) contained in the residual water obtained from the manufacture of tartaric acid after the tartrate of calcium has been precipitated by milk of lime. It is well known that, on account of the large quantity of organic substances which the said residual waters contain, the direct concentration of the same is not practically possible, so that the potassium salts contained therein are entirely lost. According to the present invention the recovery of the potassium salts is rendered possible and industrially profitable by causing the said residual water to undergo a preliminary treatment with hypochlorous acid, supplied by the hypochlorite of calcium or chlorin in the presence of a base, for the purpose of effecting the oxidation of the larger part of the interfering organic substances, and for the purpose of facilitating thereby the concentration of the water and the recovery of the salts by means of crystallization.

The complete process for the treatment of the crude tartaric substances is fully explained in the following specification.

The ground tartaric substances (wine lye, raw cream of tartar, etc.) reduced to mud by the boiling action of bubbling steam, and thereafter disintegrated by cooking in an autoclave, are treated with hydrochloric or sulfuric acid. The bitartrate of potassium contained in these substances reacts with the acids, as follows:

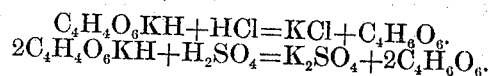

The muddy liquid thus obtained contains tartaric acid and a salt of potassium, chlorid or sulfate; the mud is separated by filtration from the tartaric solution containing the potassium salt, and the filtered liquor is treated with lime milk, in order to obtain the tartrate of calcium.

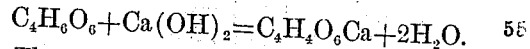

Thus the tartrate of calcium precipitates, while the potassium salts remain in the mother-lye. The mother-lye is separated from the tartrate of calcium by decantation, and the tartrate of calcium washed with water until the potassium salts are eliminated, and afterward it is treated with sulfuric acid, in order to free it from the tartaric acid. The mother-lye of the tartrate of calcium thus obtained contains dissolved organic substances and has an acid reaction due to the presence of tartaric acid, of other organic acids and of metallic acid salts. The same is treated with lime until it shows a basic reaction, and after filtration it is submitted to the process hereinafter described, for the purpose of extracting the potassium salts. The expression "mother-lye of tartrate of calcium" is to be understood as designating the residual or refuse water remaining after the precipitation of the tartrate of calcium from the solution containing the tartaric acid by the lime-milk, as hereinbefore described.

The quantity of the potassium salts contained in the mother-lye of the tartrate of calcium depends upon the strength of the tartaric solutions which are obtained in the first phases of manufacture of the tartaric acid; the potassium salts are recovered by crystallization, for which purpose the mother lye must be subjected to a suitable concentration.

The essential feature of the process consists in the oxidation of nearly all the organic substances contained in the mother-lye of the tartrate of calcium.

During the process of oxidation the water is purified, the solution becomes concentrated, the potassium salts easily crystallize out, and there is no formation of poorly conducting scale on the heating surfaces. For this purpose, advantage is taken of the oxidizing action of the hypochlorous acid (HClO). In practice, commercial chlorid of lime ($CaOCl_2$) is used, the active portion of which is the hypochlorite of calcium, $Ca(OCl_2)$. Even chlorin can be employed by causing the same to react on the mother-lye of the tartrate of calcium in the presence of a base (lime). The reaction is:

$$2Cl_2 + 2Ca(OH)_2 + \\ CaCl_2 + Ca(OCl)_2 + 2H_2O \\ Ca(OCl)_2 = CaCl_2 + O_2.$$

Through the oxidizing action of the hypochlorous acid on the organic substances contained in the mother-lye of the tartrate of calcium, there takes place the formation of carbonic acid, and, as a secondary product, carbonate of calcium. If the purified water contains sulfate of potassium, sulfate of calcium is also formed during the treatment with the hypochlorite, and the sulfate of potassium is changed into chlorid of potassium. By means of filtration the sulfate and the carbonate of calcium are separated, hydrochloric acid is added until the filtered liquid is neutralized; it is then concentrated, in order to extract the potassium salts by crystallization. If the purified water contains chlorid of potassium, it is concentrated up to about 35 to 40 Baumé, whereby crystallized chlorid of potassium is obtained.

In the annexed drawing the arrangement of a plant for commercially carrying out the process is shown diagrammatically by way of example.

After having been first treated with lime and filtered, the mother-lye of the tartrate of calcium resulting from the manufacture of tartaric acid and which contains the potassium salts, is gathered in the tank 1. This mother-lye, by means of pipes, is conveyed to tanks 2 of sandstone or other suitable material destined for the treatment with the hydrochlorite of calcium. For this treatment there is formed in the sandstone watering device 3, a mixture of hypochlorite of lime ($CaOCl_2$) and liquid from the tank 1. Thereupon the mixture is caused to drop little by little into the tanks 2, where the hypochlorite of calcium reacts with the oxidizable organic substances contained in the mother-lye of the tartrate of calcium. The liquid is kept in continuous motion during several hours by means of mechanical stirring devices. The quantity of hypochlorite to be added to the water to be purified is determined each time by a preliminary test with permanganate of potassium. If the water contained in the tanks 2, is discolored, it is filtered in the tank 4. If the purified water contains sulfate of calcium, sulfate of calcium with the carbonate of calcium remains on the filter. After that the concentration is started. This concentration is brought about by means of a vacuum evaporator of any kind. Excellent results are, for instance, obtained with the Kestner evaporators, of which the drawing shows a type well fitted for this process. For the sake of simplicity, the drawing represents a single acting rather than a multiple acting evaporator.

The apparatus works on the cycle principle. The water of the tank 4, which contains the potassium salts, by means of a pipe 5, is sucked up into the system of vertical tubes contained in the body of the vacuum room and surrounded by the steam which enters through the pipe 6, in the casing 7, of the apparatus. The water condensed from the steam passes out through the pipe 8. The water to be concentrated starts boiling at the base of the system of vertical tubes, and through the steam produced it is drawn in thin layers along the wall of the tubes, while the steam produced by the evaporation fills the central part of the tubes. The liquid and the steam, when they are leaving the system of tubes, meet the centrifugal baffle designed to entirely separate the liquid from the steam; the concentrated liquid, through the lateral pipe 9, flows into the vat 10, in the present instance containing liquid, or into the next box, if the evaporator is multiple acting, while the steam flows into the casing of the next box or into a barometric condenser 11, if the evaporator is single acting.

The concentrated mother-lye leaving the apparatus is gathered in the tank 10. Here there takes place a deposit of crystals of potassium salts, which can easily be recovered. After the tank 10 has been filled, the excess of solution saturated with potassium salts is discharged through an overflow into the tank 4, where the same becomes mixed with the other purified water and the cycle of evaporation commences again.

If the potassium salts which are obtained by this process are essentially formed of the chlorid, the residual water, which is caused to flow into the tank 4, is more and more enriched in chlorid of calcium produced by the hypochlorite of lime. When the water has reached the density of 35° to 40° Baumé, it should be taken out of the cycle and it can again be put into the reaction tanks for the manufacture of tartaric acid, as has previously been stated.

I claim:

Process of extracting potassium salts from the refuse liquor of the manufacture of tartaric acid, which consists in oxidizing the organic substances contained therein by adding to said liquor substances capable of developing hypochlorous acid, concentrating the purified mother-lye in a vacuum and crystallizing out the potassium salts.

In testimony whereof, I have signed my name to this specification in the presence of two subscribing witnesses.

AUGUSTO ALBERTI.

Witnesses:
  LETTERN LABSCEETTA,
  ANTONINO LABSCEETTA.